United States Patent
Vetter et al.

(10) Patent No.: US 11,293,199 B1
(45) Date of Patent: Apr. 5, 2022

(54) TOUCHLESS DETENT LOCK

(71) Applicant: Rockwell Collins, Inc., Cedar Rapids, IA (US)

(72) Inventors: Jakob J. Vetter, Mountlake Terrace, WA (US); Logan Butler, Lynnwood, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 863 days.

(21) Appl. No.: 16/140,910

(22) Filed: Sep. 25, 2018

(51) Int. Cl.
| E05B 47/00 | (2006.01) |
| E05B 77/38 | (2014.01) |
| E05B 85/02 | (2014.01) |
| B64D 11/02 | (2006.01) |

(52) U.S. Cl.
CPC ............ E05B 47/004 (2013.01); E05B 77/38 (2013.01); E05B 85/02 (2013.01); *B64D 11/02* (2013.01); *E05Y 2900/502* (2013.01); *E05Y 2900/531* (2013.01)

(58) Field of Classification Search
CPC .............. Y10T 292/11; Y10T 70/7057; Y10T 70/7904; E05C 19/163; E05C 19/16; E05B 47/0038; E05B 47/004; E05B 77/38; E05B 85/02; A41F 1/002; A44D 2203/00; B64D 11/02; E05Y 2900/502; E05Y 2900/531
See application file for complete search history.

(56) References Cited

U.S. PATENT DOCUMENTS

| 5,085,062 A * | 2/1992 | Capdevila .......... G07C 9/00738 70/276 |
| 8,505,989 B2 * | 8/2013 | Wells .................... E05C 19/163 292/251.5 |
| 2006/0023390 A1* | 2/2006 | Spurr ...................... E05B 81/14 361/160 |
| 2007/0007775 A1* | 1/2007 | Gallas .................... E05C 19/16 292/251.5 |
| 2011/0018659 A1* | 1/2011 | Fullerton ............... H01F 7/0284 335/295 |
| 2012/0242440 A1* | 9/2012 | Fullerton .................. E06B 5/00 335/306 |
| 2013/0207404 A1* | 8/2013 | Rundgren ........... E05B 17/0004 292/156 |
| 2014/0054904 A1* | 2/2014 | Andrews ............... E05C 19/163 292/144 |
| 2015/0204110 A1* | 7/2015 | Boutelegier ........ E05B 47/0002 292/138 |

(Continued)

Primary Examiner — Mark A Williams
(74) Attorney, Agent, or Firm — Suiter Swantz pc llo

(57) ABSTRACT

A touchless detent door lock is disclosed. In embodiments, the door lock includes a strike and a lock housing that defines a longitudinal cavity, where the strike can be linearly actuated within the longitudinal cavity from an unlocked position to a locked position, and vice versa. The door lock further includes at least one selector magnet coupled to or at least partially embedded within the strike and a plurality of position magnets coupled to or at least partially embedded within the lock housing. The position magnets include at least a first magnet corresponding to the unlocked position, a second magnet corresponding to the locked position, and a third magnet in between the first magnet and the second magnet. The first and second magnets are configured to attract the selector magnet, while the third magnet is configured to repel the selector magnet.

20 Claims, 8 Drawing Sheets

(56) References Cited

U.S. PATENT DOCUMENTS

| | | | |
|---|---|---|---|
| 2015/0354247 A1* | 12/2015 | Pena | E05B 63/0017 70/373 |
| 2016/0017633 A1* | 1/2016 | Redgrave | E05B 17/06 292/137 |
| 2019/0257118 A1* | 8/2019 | Pukari | E05B 47/0005 |
| 2021/0230900 A1* | 7/2021 | Swartz | E05B 63/08 |

* cited by examiner

TOUCHLESS DETENT LOCK

BACKGROUND

Locks, latches, switches, and other multi-position devices are often linearly or rotationally actuated. Although these devices may have discrete states/positions (e.g., locked/unlocked, on/off, etc.), the linear or rotational actuation of the devices may be continuous. This can be problematic, for example, if a device is actuated to a position that is in between two different states such that the device is not fully in one state (e.g., locked state/position) or the other (e.g., unlocked state/position). To avoid such situations, there is a need for systems that allow locks, latches, switches, or other multi-state/multi-position devices to smoothly and completely transition from one state/position to another.

SUMMARY

In one aspect, embodiments of the inventive concepts disclosed herein are directed to a touchless detent door lock that employs magnets to facilitate a smooth and complete transitions between locked and unlocked positions of the door lock. In embodiments, the door lock includes a strike and a lock housing that defines a longitudinal cavity. The longitudinal cavity is configured to house at least a portion of the strike, where the strike can be linearly actuated within the longitudinal cavity from an unlocked position to a locked position, and vice versa. The lock housing also has an opening at an end of the longitudinal cavity for the strike to partially extend from the lock housing when the strike is linearly actuated within the longitudinal cavity from the unlocked position to the locked position. The door lock further includes at least one selector magnet coupled to or at least partially embedded within the strike and a plurality of position magnets coupled to or at least partially embedded within the lock housing. The position magnets include at least a first magnet corresponding to the unlocked position, a second magnet corresponding to the locked position, and a third magnet disposed in between the first magnet and the second magnet. The first and second magnets are configured to attract the selector magnet (e.g., to pull the strike into the unlocked or locked position), and the third magnet is configured to repel the selector magnet (e.g., to prevent the strike from settling in a position that is not in either of the unlocked or locked positions).

In another aspect, embodiments of the inventive concepts disclosed herein are directed to an aircraft lavatory door system that employs the door lock described herein. In embodiments, the aircraft lavatory door includes an aircraft lavatory door equipped with the touchless detent door lock described herein.

In another aspect, embodiments of the inventive concepts disclosed herein are directed to a system for transitioning between discrete positions, where what is being transitioned is a selector element. In embodiments, the system includes a selector housing (being a selector element housing) and a selector (being a selector element) configured to be linearly or rotationally actuated to a selected position from a plurality of predefined discrete positions. The system further includes at least one selector magnet coupled to or at least partially embedded within the selector and a plurality of position magnets coupled to or at least partially embedded within the selector housing. The position magnets include at least a first magnet corresponding to a first position of the plurality of discrete positions, a second magnet corresponding to a second position of the plurality of discrete positions, and a third magnet disposed in between the first magnet and the second magnet. The first and second magnets are configured to attract the selector magnet (e.g., to pull the strike into a respective one of the discrete positions), and the third magnet is configured to repel the selector magnet (e.g., to prevent the strike from settling in a position that is not one of the predefined discrete positions).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
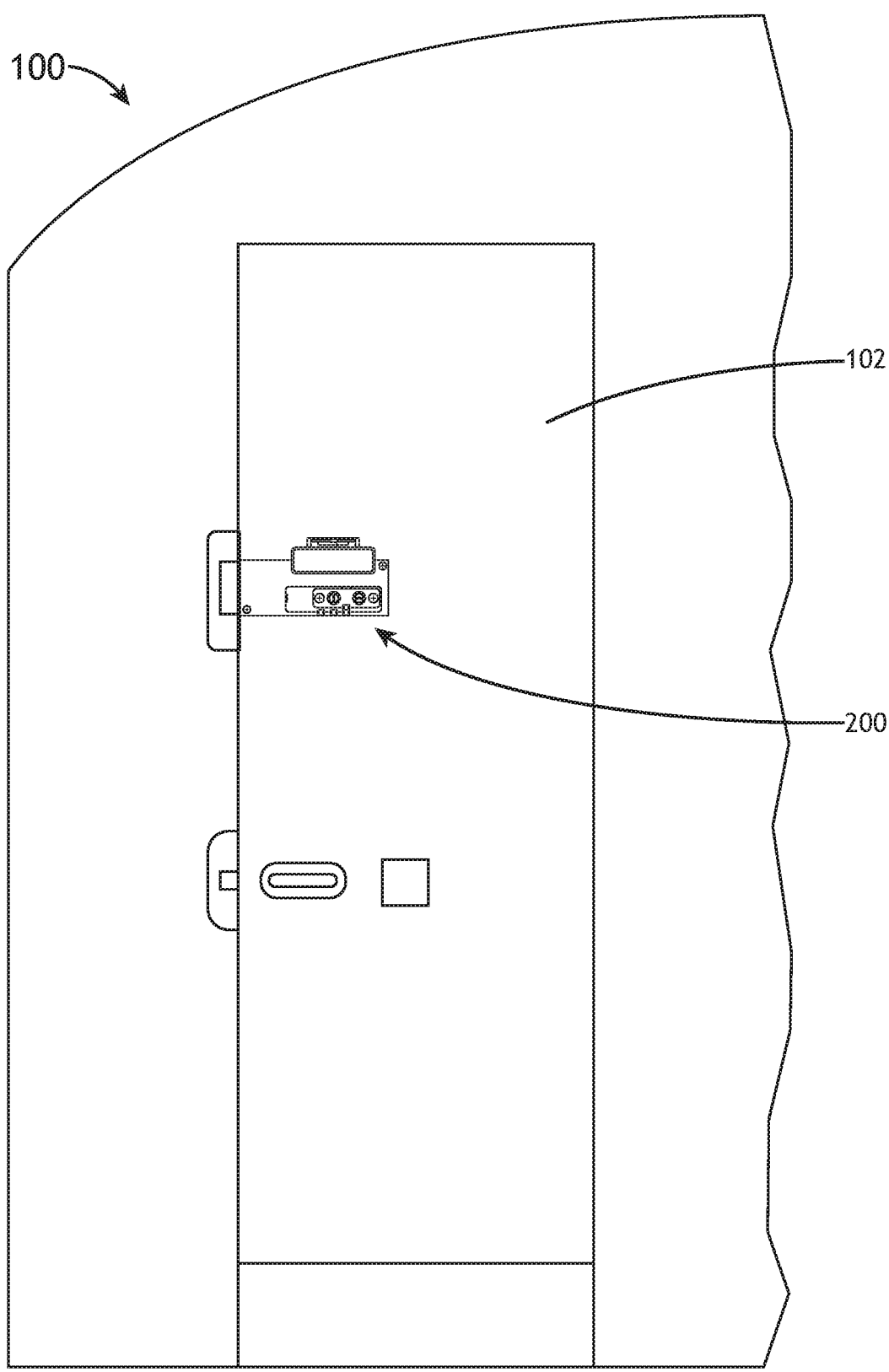
FIG. 1A is a perspective view of an example environment (e.g., an aircraft lavatory environment) in which a touchless detent door lock may be employed, in accordance with an example embodiment of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system that employs magnets to facilitate a smooth and complete transitions transitioning between discrete positions. For example, some of the embodiments disclosed herein are directed to a touchless detent door lock that employs magnets to facilitate a smooth and complete transitions between locked and unlocked positions of the door lock. The door lock employs attractive magnetic forces to pull a strike into the locked or unlocked positions, which coincide with the limits of the strike's range of motion. The attractive forces create stability, analogous to a ball in a valley, where small strike displacements (e.g. vibration, unintentional actuation) do not move the strike out of the locked or unlocked positions. Opposing magnetic forces are employed between the locked and unlocked positions (e.g., at the midpoint of the strike's range of motion) to create instability. This pushes the strike into the locked or unlocked position, where the attractive magnetic forces prevail. This is analogous to a ball on a hill, where small strike displacements cause the strike to 'fall' into either the locked or unlocked positions, thus making it virtually impossible to have a partially engaged latch in this configuration. Example embodiments of the touchless detent door lock and other systems that employ magnets to facilitate a smooth and complete transitions transitioning between discrete positions are described in further detail below with reference to FIGS. 1A through 6B.

FIG. 1A illustrates an example environment 100 (e.g., an aircraft lavatory) that includes a door 102 equipped with a touchless detent door lock 200. In embodiments, the lavatory door 102 may be a swinging door or folding door that can be locked/latched with the touchless detent door lock 200 when the door 102 is closed. Although example embodiments of the present disclosure are shown and described in an aviation environment, the inventive concepts of the present disclosure may be implemented in other settings. For example, the embodiments of the present disclosure may be incorporated into locks and/or latches for doors, hatches, lids, or other barrier/enclosure devices of any air, land, or water-based vehicle, permanent structure (e.g., building doors/enclosures), or personal equipment (e.g., storage containers, and the like). In the interest of simplicity and to most clearly define the inventive concepts of the present disclosure, embodiments may be described throughout the present disclosure in an aircraft lavatory environment. However, these references are not to be regarded as limiting. Furthermore, embodiments of the inventive concepts disclosed herein may be implemented in other devices, such as, but not limited to, mechanical switches/controls, electromechanical switches/controls, and other linearly or rotationally actuated multi-position devices.

Figure 1B:
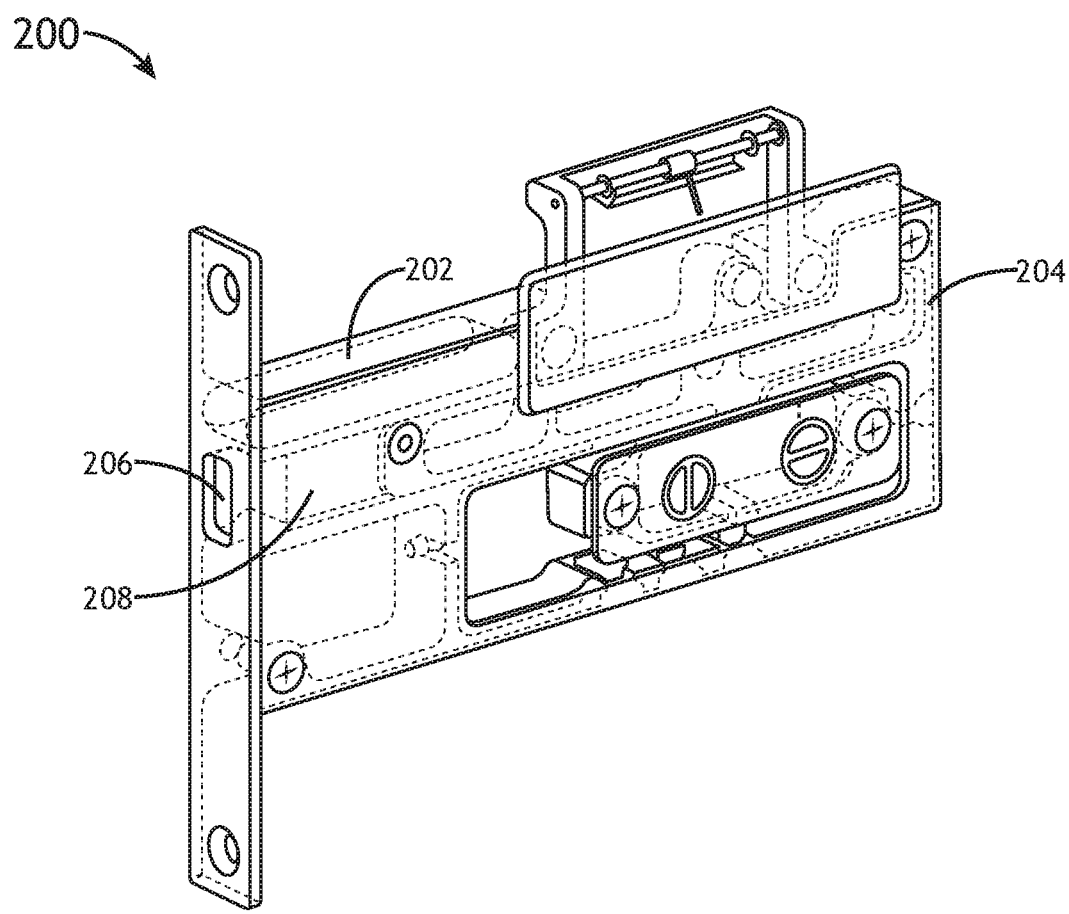
FIG. 1B is a perspective view of a touchless detent door lock, such as the touchless detent door lock illustrated in FIG. 1A, in accordance with an example embodiment of this disclosure.

An example embodiment of the touchless detent door lock 200 is illustrated in FIG. 1B. In embodiments, the door lock 200 includes a lock housing 202 that defines a longitudinal cavity 204. The door lock 200 further includes a strike 208 at least partially disposed within the longitudinal cavity 204. For example, the longitudinal cavity 204 is configured to house at least a portion of the strike 208, where the strike 208 can be linearly actuated within the longitudinal cavity 204 from an unlocked position to a locked position, and vice versa. The lock housing 202 also has an opening 206 at an end of the longitudinal cavity 204 for the strike 208 to partially extend from the lock housing 202 when the strike 208 is linearly actuated within the longitudinal cavity 204 from the unlocked position to the locked position.

Figure 2A:
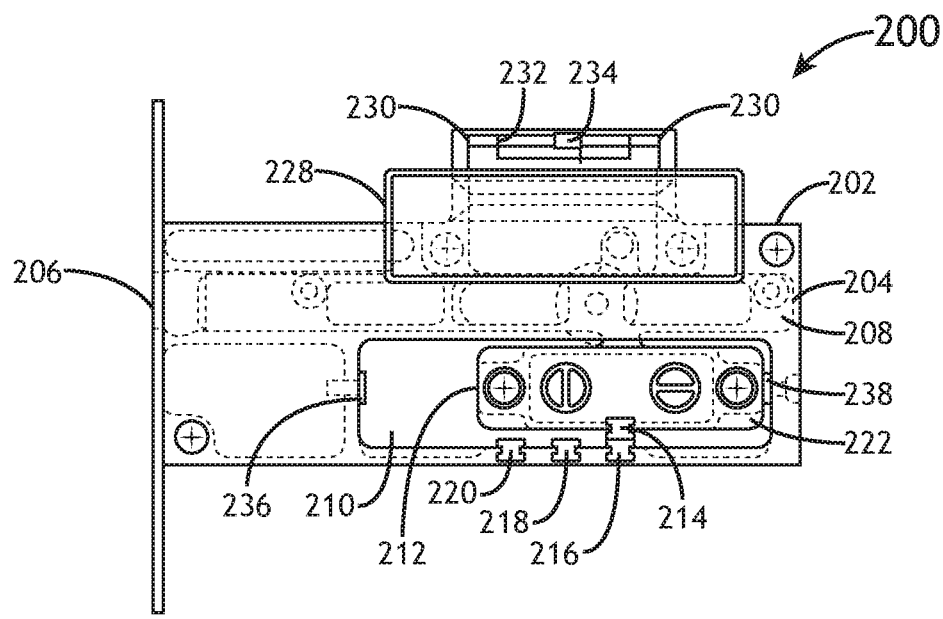
FIG. 2A is a side view of a touchless detent door lock in an unlatched/unlocked position, in accordance with an example embodiment of this disclosure.
Figure 2B:
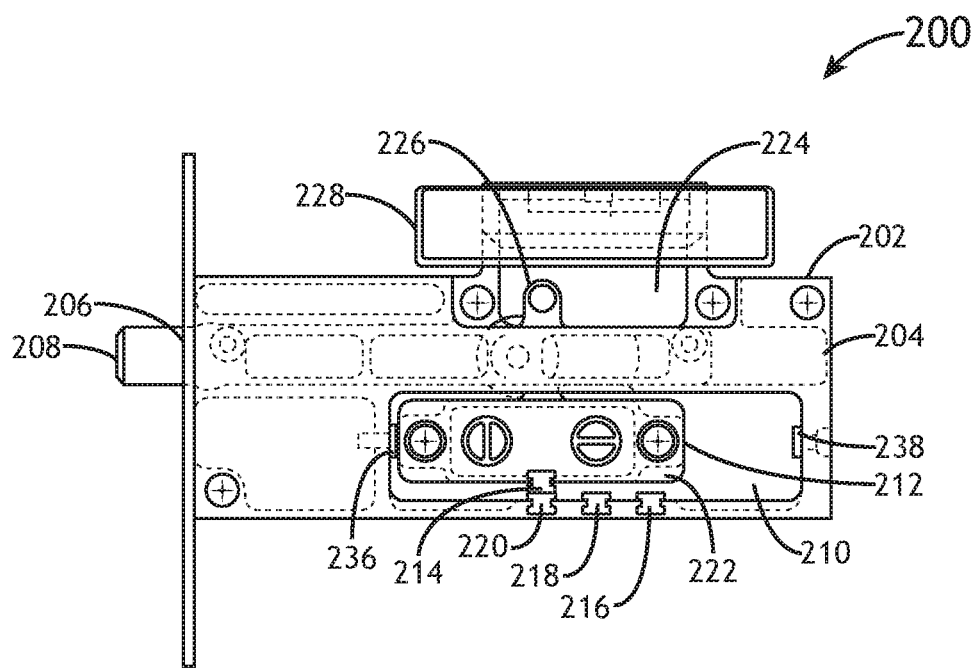
FIG. 2B is a side view of a touchless detent door lock in a latched/locked position, in accordance with an example embodiment of this disclosure.

Embodiments of the door lock 200 are further illustrated in FIGS. 2A and 2B, where the door lock 200 is shown to include at least one selector magnet 214 coupled to or at least partially embedded within the strike 208 and a plurality of position magnets (e.g., magnets 216, 218, and 220) coupled to or at least partially embedded within the lock housing 202. The magnets may comprise permanent magnets and/or electromagnets. The position magnets include at least one magnet 216 corresponding to the unlocked position and at least one magnet 220 corresponding to the locked position. Magnets 216 and 220 are configured to attract the selector magnet 214 (e.g., to pull the strike 218 into the unlocked or locked position, respectively). For example, magnets 216 and 220 can have an inward facing polarity (e.g., N or S) that is different from (e.g., the opposite of) the inward facing polarity (e.g., S or N) of the selector magnet 214. The position magnets further include at least one other magnet 218 disposed in between magnets 216 and 220 that is configured to repel the selector magnet 214 (e.g., to prevent the strike from settling in a position that is not in either of the unlocked or locked positions). For example, magnet 218 can have an inward facing polarity (e.g., S or N) that is the same as the inward facing polarity (e.g., S or N) of the selector magnet 214 and different from (e.g., the opposite of) the inward facing polarity (e.g., N or S) of magnets 216 and 220.

Figure 3A:
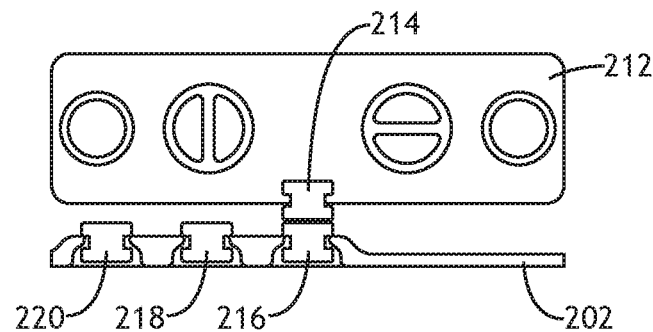
FIG. 3A is a zoomed-in view of a door lock strike in an unlatched/unlocked position, in accordance with an example embodiment of this disclosure.
Figure 3B:
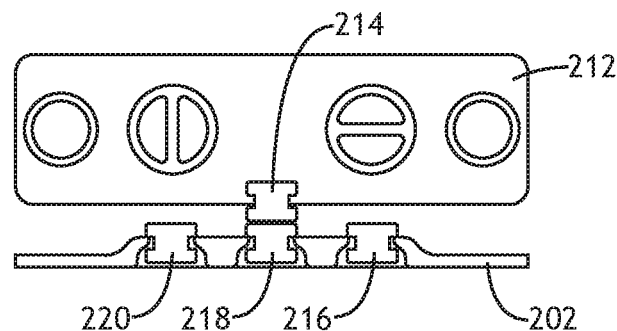
FIG. 3B is a zoomed-in view of a door lock strike in an unstable position, in accordance with an example embodiment of this disclosure.
Figure 3C:
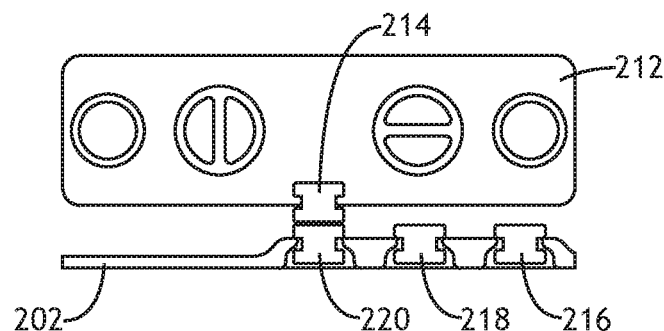
FIG. 3C is a zoomed-in view of a door lock strike in a latched/locked position, in accordance with an example embodiment of this disclosure.
Figure 4A:
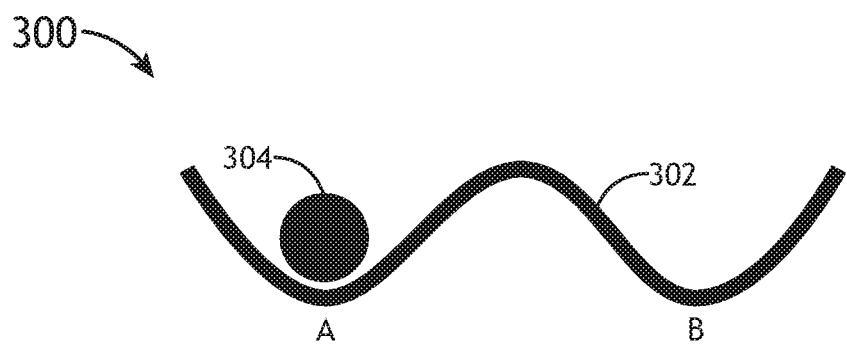
FIG. 4A is a schematic illustrating a stable position, such as the unlatched/unlocked position illustrated in FIG. 3A or the latched/locked position of the door lock strike illustrated in FIG. 3C, in accordance with an example embodiment of this disclosure.
Figure 4B:
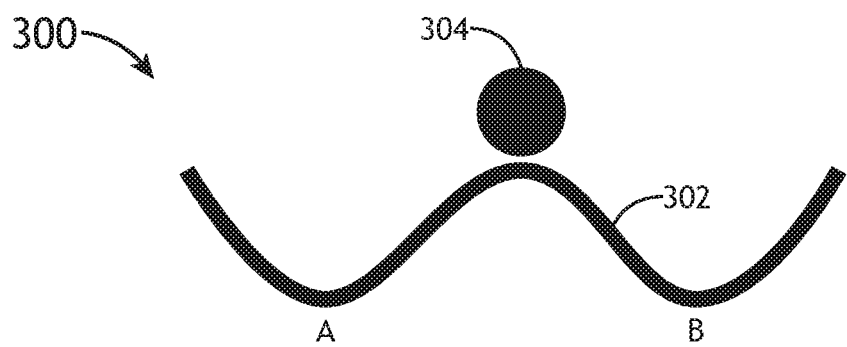
FIG. 4B is a schematic illustrating an unstable position, such as the position of the door lock strike illustrated in FIG. 3B (e.g., neither the unlatched/unlocked position nor the latched/locked position), in accordance with an example embodiment of this disclosure.

As shown in FIG. 3A, when the selector magnet 214 is brought in proximity to magnet 216, the attractive force between the magnets 214 and 216 causes the selector magnet 214 to be pulled towards magnet 216. In turn, this causes the strike 208 to completely transition into the discrete position (i.e., the unlocked position) corresponding to magnet 216. Similarly shown in FIG. 3C, when the selector magnet 214 is brought in proximity to magnet 220, the attractive force between the magnets 214 and 220 causes the selector magnet 214 to be pulled towards magnet 220. In turn, this causes the strike 208 to completely transition into the discrete position (i.e., the locked position) corresponding to magnet 220. In this regard, the positions/states of the selector magnet 214 in FIGS. 3A and 3C are "stable" states. Conversely, when the selector magnet 214 is brought in proximity to magnet 218 (e.g., as shown in FIG. 3B), the repulsive force between the magnets 214 and 218 causes the selector magnet 214 to be pushed away from magnet 218 and either towards magnet 216 or magnet 220, depending on which of the magnets 216 or 220 has a stronger pull force on the selector magnet 214. This causes the strike 208 to either transition into the discrete position (i.e., the unlocked position) corresponding to magnet 216 or the discrete position (i.e., the locked position) corresponding to magnet 220, but in either case, the strike 208 is prevented from remaining in an "in between" position. In this regard, the position/state of the selector magnet 214 in FIG. 3B is an "unstable" state. FIGS. 4A and 4B schematically illustrate the principle by which the door lock 200 operates within the context of a mechanical system 300 including a ball 304 that rolls on a track 302, where the ball 304 can settle in a stable position (e.g., depression A or B) but is likely to fall one way or the other if it is not perfectly balanced and/or if minimal force is applied in one direction or the other when the ball 304 is at the top of a hill between depressions A and B.

The strike 208 and the lock housing 202 may be configured to maintain a gap between the selector magnet 214 and the position magnets (e.g., magnets 216, 218, 220) to prevent direct contact between the selector magnet 214 and the position magnets (e.g., magnets 216, 218, 220). For example, the lock housing 202 may be configured to suspend the strike 208 so that the selector magnet 214 is a very small distance away from the position magnets (e.g., magnets 216, 218, 220) to prevent sticking due to direct contact between the magnets. This can help to facilitate smoother movement (e.g., sliding) of the strike 208 between unlocked and locked positions. Furthermore, because the action is contactless, detent wear/grinding is prevented resulting in a consistent actuation force over the life of the product that does not require adjustment. The door lock 200 may further includes brushings (e.g., plastic or fabric brushings) or bearings between the strike 208 and the longitudinal cavity 204 to reduce rattling of the strike 208 within the longitudinal cavity 204.

In some embodiments, the strike 208 includes a base member 212 (coupled to and/or forming a portion of the strike 208) that has the selector magnet 214 coupled to or at least partially embedded within the base member 212. As shown in FIGS. 2A and 2B, in such embodiments the lock housing 202 may further define a cavity 210 configured to house at least a portion of the base member 212, where the position magnets (e.g., magnets 216, 218, 220) are disposed within the cavity 210. For example, the base member 212 may be extend from the main body of the strike 208 into a cavity 210 that is adjacent to the longitudinal cavity 204 that houses the main body of the strike 208. The base member 212 may include a faceplate 222 that faces outwardly from the door lock 200 with indicia formed thereon to show whether the strike 208 is in a locked/latched position or an unlocked/unlatched position. The cavity 210 that houses the base member 212 may include at least two bumpers (e.g., bumpers 236 and 238) disposed at opposite ends of the cavity 210 to limit a range of motion of the base member 212 within the cavity 210 (hence limiting the range of motion of the strike 208). The bumpers 236 and 238 may also provide a cushion between the base member 212 and the inner surfaces of the cavity 210, resulting in quiet, positive stops when the strike 208 is transitioned between the unlocked and locked positions. For example, the bumpers 236 and 238 may be formed from rubber, foam, fabric, or any other deformable material.

The strike 208 and/or base member 212 may be coupled to knob that extends outwardly in a direction opposite the faceplate 222 so that the strike 208 can be actuated from one position to another by sliding the knob towards the selected position. The door lock 200 may further include an override trigger 226 for actuating the strike 208 from the same side as the faceplate 222 (e.g., from outside the lavatory 100). For example, the override trigger 226 may be accessed when emergency entry into the lavatory 100 is required. In such embodiments, the lock housing 202 may further define an override access cavity 224 configured to house at least a portion of the override trigger 226. The override trigger 226 may be coupled to and/or may form a portion of the strike 208. The override trigger 226 may be extend from the main body of the strike 208 into an override access cavity 224 that is adjacent to the longitudinal cavity 204 that houses the main body of the strike 208. The lock housing 202 can be coupled to an override access flap 228 that is configured to conceal the override access trigger 226 by covering the override access cavity 224 when the override access flap 228 is in a closed position. Conversely, the override access cavity 224 and the override access trigger 226 are at least partially exposed when the override access flap 228 is in an open position. As shown in FIG. 2A, the override access flap 228 may be pivotably coupled to the lock housing 202, for example by rod 232 that extends between two connection points 230. The door lock 200 may further include a biasing spring 234 that maintains the override access flap 228 in a closed position unless an external (e.g., user) force is applied to open the override access flap 228. In other embodiments, the override access flap 228 may be slidably coupled or rotatably coupled to the lock housing 202 and/or locked/latched in place. The override access flap 228 and lock override actuation can be configured to be hand-operated, such that a flight attendant can easily open or remove the override access flap 228 without any keys or tools. In other embodiments, a specific key or tool may be required to open or remove the override access flap 228 (e.g., to prevent passengers from accessing the override access trigger 226).

In some embodiments, the lock and unlock actuation forces are independent and tunable which provides design flexibility and increases perceived quality for the user. The actuation force is inversely dependent on the distance between the magnets (e.g., between the selector magnet 214 and magnet 216 or 220). In some embodiments, the magnet 216 and magnet 220 are tuned (with respect to the selector magnet 214) so that an actuation force required to transition the strike 208 from the unlocked position to the locked position is less than an actuation force required to transition the strike from the locked position to the unlocked position. For example, the magnets 216 and 220 can have selected magnet strengths and/or positions. In an example embodiment, the door lock 200 may be configured with magnet strength and/or positioning so the force to engage the lock is in the range of 0.5 to 3 lbs. (e.g., 2 lbs.), while the force to disengage the lock is in the range of 2 to 8 lbs. (e.g., 5 lbs.). In some embodiments, one or more of the magnets (e.g., magnets 214, 216, 218, 220, etc.) may be adjustable magnets. For example, the magnets may be physically repositionable and/or electrically tunable (e.g., electromagnets).

With fixed magnets, the magnet-to-magnet distances (and therefore actuation forces) are set by the geometry of the strike 208 and housing 202 where the magnets are installed. Typical manufacturing tolerances can be invoked to achieve consistent actuation forces among many assemblies, but the assembly does not have built-in adjustability. In such embodiments, if the user wishes to reduce the engagement force, since the magnets are fixed, new components must be designed to alter the magnet-to-magnet distance.

In embodiments that employ adjustable magnets, the user may vary the actuation force without replacing parts. This may be accomplished by mounting the magnets to a threaded housing, where the magnet-to-magnet distance is varied by threading the housing in or out. Utilizing adjustable magnets can provide capability to fine tune the actuation forces and can also allow for looser tolerances on the machined parts to reduce cost.

Figure 1C:
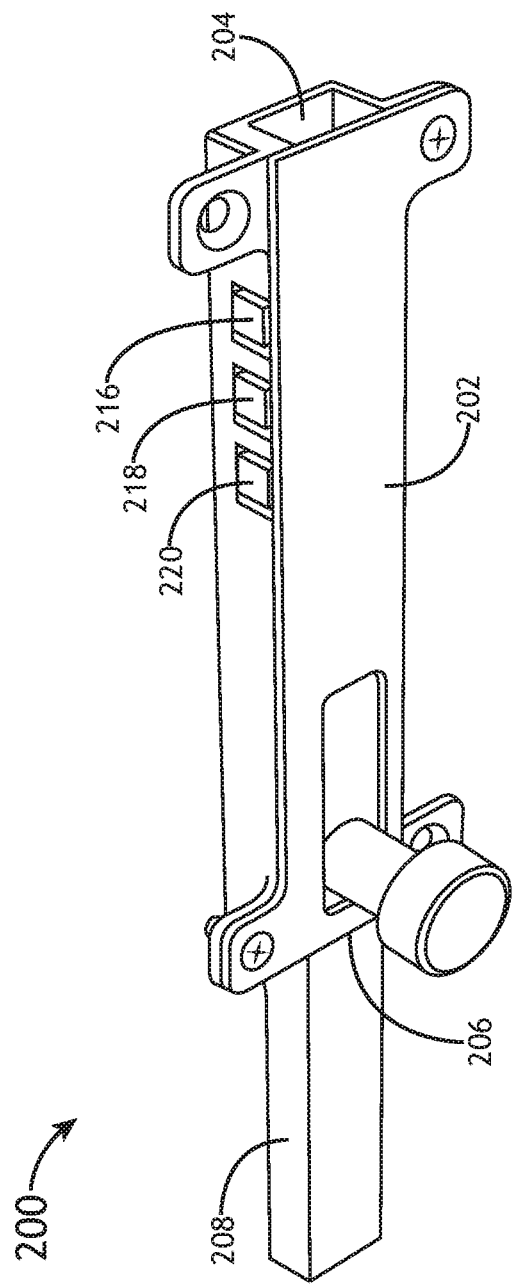
FIG. 1C is a perspective view of another touchless detent door lock, in accordance with an example embodiment of this disclosure.

FIG. 1C illustrates another embodiment of the door lock 200 where the strike 208 is a more simplified structure, without a base member 212 or override access trigger 226. In the embodiment illustrated in FIG. 1C, the selector magnet 214 is coupled to or at least partially embedded within a main body of the strike 208, and the position magnets (e.g., magnets 216, 218, 220) are at least partially disposed within the longitudinal cavity 204 of the housing 202. In some embodiments, the door lock 200 as shown in FIG. 1C may further include an override access trigger 226, cavity 224, and flap 228. For example, the override access components may be adjacent to the longitudinal cavity 204.

Other modification and/or combinations of the embodiments illustrated in FIGS. 1A through 3C can be made without departing from the scope of this disclosure. For example, in some embodiments, the position magnets (e.g., magnets 216, 218, 220) may be coupled to or at least partially embedded within the strike 208 and the selector magnet (or magnets) 214 may be coupled to or at least partially embedded within the lock housing 202.

The door lock 200 illustrated in FIGS. 1A through 3C is described in the context of an aircraft lavatory door 102 using a deadbolt-style latch, such as on slab doors. However, other applications may include other doors, covers, latches or additional customer touch points where the 'feel' is high priority or where partially engaged latches could result in safety hazards or malfunction. Additionally, the inventive concepts described herein can be implemented in any multi-position device (e.g., any linear or rotary lock, latch, switch, adjustable length device, dial, lever, etc.).

In the example embodiments of the door lock 200 illustrated in FIGS. 1A through 3C, the door lock 200 is shown to include one attractive magnet (e.g., magnets 216, 220) for each of the discrete positions (e.g., unlocked, locked) with one repulsive magnet (e.g., magnet 218) in between the attractive magnets (e.g., magnets 216, 220) to prevent settling of the strike 208 in a position that is not in either of the unlocked or locked positions. However, in other embodiments, any number of attractive magnets can be used for each of the discrete positions (e.g., unlocked, locked, etc.), and similarly, any number of repulsive magnets can be used for the regions/gaps between the discrete positions. The door lock 200 can also include any number of selector magnets 214; for example, the selector magnet 214 may be replaced with an array of selector magnets 214 without departing from the scope of this disclosure. Furthermore, any number of discrete positions can be implemented with alternating attractive magnets and repulsive magnets that include magnets (or groups of magnets) that have a first inward facing polarity (e.g., N or S) for the discrete positions and magnets (or groups of magnets) that have a second (different/opposite) inward facing polarity (e.g., S or N) for the regions/gaps between the discrete positions. In this regard, the door lock 200 can be configured with more than two positions. For example, the door lock 200 can be configured with a fully locked, an unlocked position, and an intermediate (e.g., partially engaged) lock position. Other examples of three or more position devices include, but are not limited to, a three-position configuration used to control lighting (1: off, 2: dim, 3: bright), fan speed (1: off, 2: low, 3: high), water temperature (1: cold, 2: warm, 3: hot), water selector valve (1: toilet, 2: toilet and faucet, 3: faucet). The inventive concepts described herein may be integrated into any system for transitioning between two or more discrete positions. For example, FIGS. 5A and 6A illustrate embodiments of a linearly actuated system 400 and a rotationally actuated system 600, respectively.

Figure 5A:
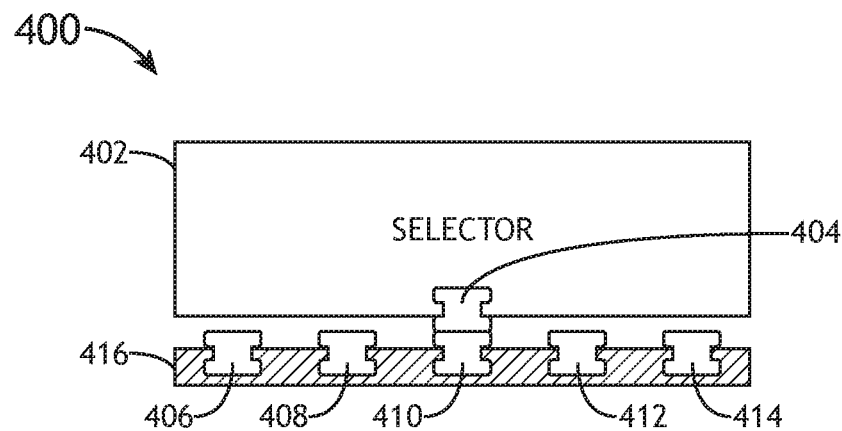
FIG. 5A illustrates a system for transitioning between discrete positions with a linearly actuated selector, in accordance with an example embodiment of this disclosure.
Figure 6A:
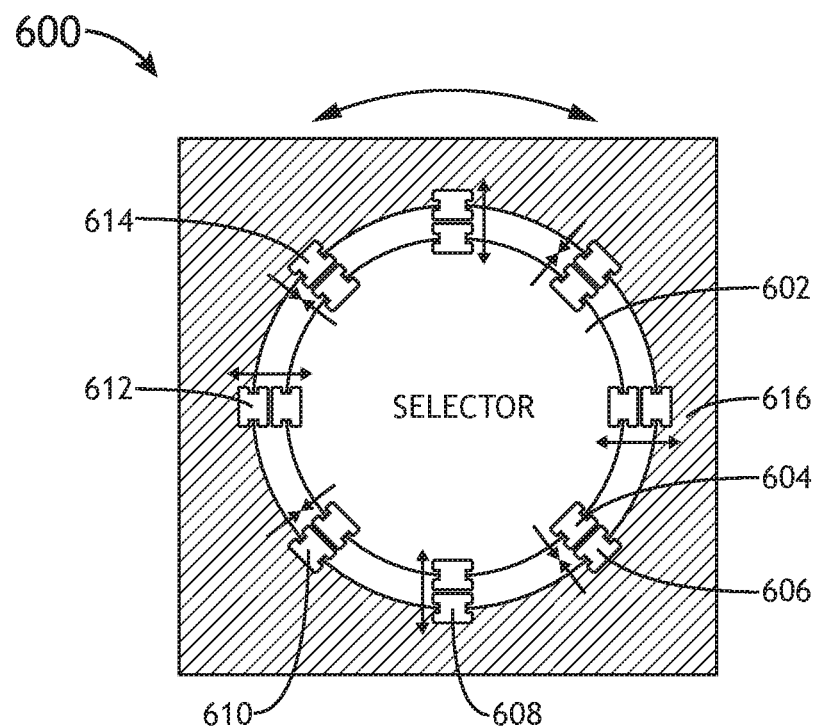
FIG. 6A illustrates a system for transitioning between discrete positions with a rotationally actuated selector, in accordance with an example embodiment of this disclosure.

As shown in FIG. 5A, a linearly actuated system 400 for transitioning between two or more discrete positions may generally include a selector 402 adjacent to or at least partially housed within a selector housing 416, where the selector 402 can be linearly actuated to two or more discrete positions defined by the selector housing 416. At least one selector magnet 404 can be coupled to or at least partially embedded within the selector 402 and a plurality of position magnets (e.g., magnets 406, 408, 410, 412, 414) can be coupled to or at least partially embedded within the selector housing 416. The magnets may comprise permanent magnets and/or electromagnets.

The position magnets (e.g., magnets 406, 408, 410, 412, 414) may be arranged along a line parallel to an actuation axis of the selector 402. The position magnets include at least one magnet 406 corresponding to a first position and at least one magnet 410 corresponding to a second position. Magnets 406 and 410 are configured to attract the selector magnet 404 (e.g., to pull the selector 402 into the first or second position, respectively). For example, magnets 406 and 410 can have an inward facing polarity (e.g., N or S) that is different from (e.g., the opposite of) the inward facing polarity (e.g., S or N) of the selector magnet 404. The position magnets further include at least one other magnet 408 disposed in between magnets 406 and 410 that is configured to repel the selector magnet 404 (e.g., to prevent the selector 402 from settling in a position that is in between the first and second positions). For example, magnet 408 can have an inward facing polarity (e.g., S or N) that is the same as the inward facing polarity (e.g., S or N) of the selector magnet 404 and different from (e.g., the opposite of) the inward facing polarity (e.g., N or S) of magnets 406 and 410. This same arrangement can be repeated to implement any number of discrete positions. For example, in embodiments, the system 400 includes at least another magnet 414 that corresponds to a third position. Magnet 414 can be configured to attract the selector magnet 404 (e.g., to pull the selector 402 into the third position). For example, magnet 414 can have an inward facing polarity (e.g., N or S) that is different from (e.g., the opposite of) the inward facing polarity (e.g., S or N) of the selector magnet 404. The position magnets further include at least one other magnet 412 disposed in between magnets 410 and 414 that is configured to repel the selector magnet 404 (e.g., to prevent the selector 402 from settling in a position that is in between the second and third positions). For example, magnet 412 can have an inward facing polarity (e.g., S or N) that is the same as the inward facing polarity (e.g., S or N) of the selector magnet 404 and different from (e.g., the opposite of) the inward facing polarity (e.g., N or S) of magnets 410 and 414.

Figure 5B:
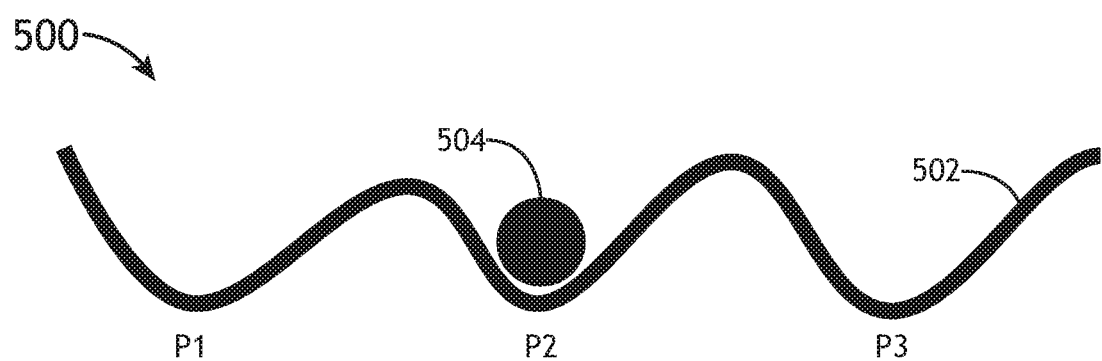
FIG. 5B is a schematic illustrating a stable position, such as the selector position illustrated in FIG. 5A, in accordance with an example embodiment of this disclosure.

FIG. 5B schematically illustrates the principle by which the system 400 operates within the context of a mechanical system 500 including a ball 504 that rolls on a track 502, where the ball 504 can settle in a stable position (e.g., depression P1, P2, or P3) but is likely to fall one way or the other if it is not perfectly balanced and/or if minimal force is applied in one direction or the other when the ball 504 is at the top of a hill between depressions P1 and P2 or depressions P2 and P3.

The selector 402 and the selector housing 416 may be configured to maintain a gap between the selector magnet 404 and the position magnets (e.g., magnets 406, 408, 410, 412, 414) to prevent direct contact between the selector magnet 404 and the position magnets (e.g., magnets 406, 408, 410, 412, 414). For example, the selector housing 416 may be configured to suspend the selector 402 so that the selector magnet 404 is a very small distance away from the position magnets (e.g., magnets 406, 408, 410, 412, 414) to prevent sticking due to direct contact between the magnets. This can help to facilitate smoother movement (e.g., linear actuation) of the selector 402 between positions. Furthermore, because the action is contactless, wear/grinding is prevented resulting in a consistent actuation force over the life of the product that does not require adjustment.

Various modifications to the system 400 can be made without departing from the scope of this disclosure. For example, the system 400 can employ any number of selector magnets and/or position magnets. The system 400 can be configured with any number of discrete positions. In some embodiments, the magnets may be reversed. For example, the position magnets (e.g., magnets 406, 408, 410, 412, 414) may be coupled to or at least partially embedded within the selector 402 (e.g., the moveable system 400 structure) and the selector magnet (or magnets) 404 may be coupled to or at least partially embedded within the selector housing 416 (e.g., the stationary base/housing structure of the system 400).

As shown in FIG. 6A, a rotationally actuated system 600 for transitioning between two or more discrete positions may generally include a selector 602 at least partially housed within a selector housing 616 that curves around the selector 602, where the selector 602 can be rotationally actuated to two or more discrete positions defined by the selector housing 616. At least one selector magnet 604 can be coupled to or at least partially embedded within the selector 602 and a plurality of position magnets (e.g., magnets 606, 608, 610, 612, 614) can be coupled to or at least partially embedded within the selector housing 616. The magnets may comprise permanent magnets and/or electromagnets.

The position magnets include at least one magnet 606 corresponding to a first position and at least one magnet 610 corresponding to a second position. Magnets 606 and 610 are configured to attract the selector magnet 604 (e.g., to pull the selector 602 into the first or second position, respectively). For example, magnets 606 and 610 can have an inward facing polarity (e.g., N or S) that is different from (e.g., the opposite of) the inward facing polarity (e.g., S or N) of the selector magnet 604. The position magnets further include at least one other magnet 608 disposed in between magnets 606 and 610 that is configured to repel the selector magnet 604 (e.g., to prevent the selector 602 from settling in a position that is in between the first and second positions). For example, magnet 608 can have an inward facing polarity (e.g., S or N) that is the same as the inward facing polarity (e.g., S or N) of the selector magnet 604 and different from (e.g., the opposite of) the inward facing polarity (e.g., N or S) of magnets 606 and 610. This same arrangement can be repeated to implement any number of discrete positions. For example, in embodiments, the system 600 includes at least another magnet 614 that corresponds to a third position. Magnet 614 can be configured to attract the selector magnet 604 (e.g., to pull the selector 602 into the third position). For example, magnet 614 can have an inward facing polarity (e.g., N or S) that is different from (e.g., the opposite of) the inward facing polarity (e.g., S or N) of the selector magnet 604. The position magnets further include at least one other magnet 612 disposed in between magnets 610 and 614 that is configured to repel the selector magnet 604 (e.g., to prevent the selector 602 from settling in a position that is in between the second and third positions). For example, magnet 612 can have an inward facing polarity (e.g., S or N) that is the same as the inward facing polarity (e.g., S or N) of the selector magnet 604 and different from (e.g., the opposite of) the inward facing polarity (e.g., N or S) of magnets 610 and 614.

In some embodiments, alternating attractive and repulsive position magnets are arranged along a curve that at least partially surrounds a rotational axis of the selector 602. For example, magnets with alternating orientation may be evenly distributed about the selector 602 as shown in FIG. 6A. In such embodiments, the selector 602 may have a plurality of selector magnets 604 distributed about the selector 602 with the same spacing as the position magnets (as shown in FIG. 6A) or the same spacing as the attractive magnets (e.g., magnets 606, 610, 614, etc.) only. Such arrangements may provide smoother and more uniform rotation of the selector 602 within the selector housing 616.

Figure 6B:
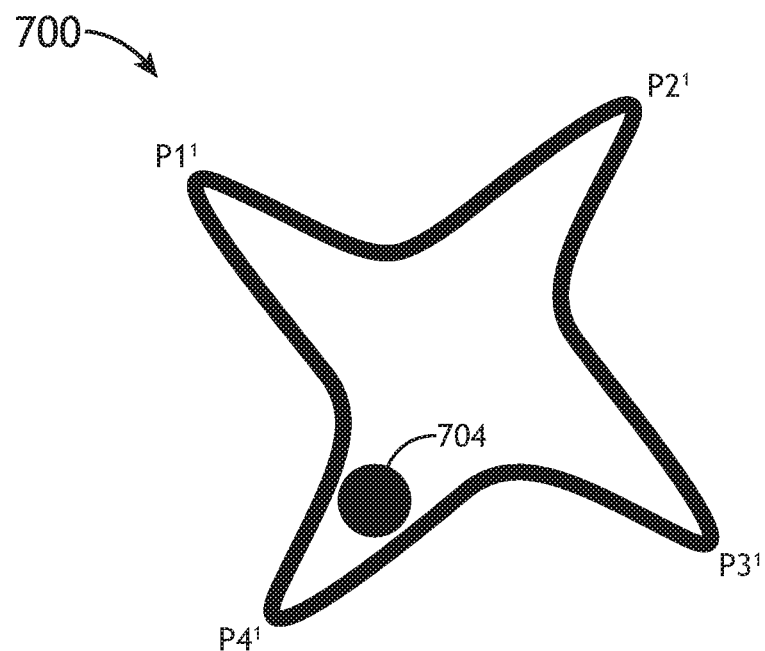
FIG. 6B is a schematic illustrating a stable position, such as the selector position illustrated in FIG. 6A, in accordance with an example embodiment of this disclosure.

FIG. 6B schematically illustrates the principle by which the system 600 operates within the context of a mechanical system 700 including a ball 704 that rolls within a closed track 702, where the ball 704 can settle in a stable position (e.g., P1', P2', P3', or P4') but is likely to roll one way or the other if it is not perfectly balanced and/or if minimal force is applied in one direction or the other when the ball 704 is at a position between any two of the stable position (e.g., P1', P2', P3', or P4').

The selector 602 and the selector housing 616 may be configured to maintain a gap between the selector magnet 604 and the position magnets (e.g., magnets 606, 608, 610, 612, 614) to prevent direct contact between the selector magnet 604 and the position magnets (e.g., magnets 606, 608, 610, 612, 614). This can help to facilitate smoother movement (e.g., rotational actuation) of the selector 602 between positions. Furthermore, because the action is contactless, wear/grinding is prevented resulting in a consistent actuation force over the life of the product that does not require adjustment.

Various modifications to the system 600 can be made without departing from the scope of this disclosure. For example, the system 600 can employ any number of selector magnets and/or position magnets. The system 600 can be configured with any number of discrete positions. In some embodiments, the magnets may be reversed. For example, the position magnets (e.g., magnets 606, 608, 610, 612, 614) may be coupled to or at least partially embedded within the selector 602 (e.g., the moveable system 600 structure) and the selector magnet (or magnets) 604 may be coupled to or at least partially embedded within the selector housing 616 (e.g., the stationary base/housing structure of the system 600).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A door lock, comprising:
   a strike;
   a lock housing that defines a longitudinal cavity configured to house at least a portion of the strike, the lock housing having an opening at an end of the longitudinal cavity for the strike to partially extend from the lock housing when the strike is moveably linearly actuated within the longitudinal cavity from an unlocked position to a locked position;
   at least one selector magnet coupled to or at least partially embedded within the strike; and
   a plurality of position magnets coupled to or at least partially embedded within the lock housing, the plurality of position magnets including at least a first magnet corresponding to the unlocked position of the strike, a second magnet corresponding to the locked position of the strike, and a third magnet disposed in between the first magnet and the second magnet, wherein the first and second magnets are configured to attract the at least one selector magnet, and the third magnet is configured to repel the at least one selector magnet.

2. The door lock of claim 1, wherein the strike and the lock housing are configured to maintain a gap between the at least one selector magnet and the plurality of position magnets to prevent contact between the at least one selector magnet and the plurality of position magnets.

3. The door lock of claim 1, wherein the first magnet and the second magnet are tuned so that an actuation force required to transition the strike from the unlocked position to the locked position is less than an actuation force required to transition the strike from the locked position to the unlocked position.

4. The door lock of claim 3, wherein the first magnet and the second magnet are tuned based on at least one of magnet position or magnet strength.

5. The door lock of claim 3, wherein the at least one selector magnet and the plurality of position magnets include one or more adjustable magnets.

6. The door lock of claim 1, wherein the strike includes a base member having the at least one selector magnet coupled to or at least partially embedded within the base member, the lock housing further defines a second cavity configured to house at least a portion of the base member, and the plurality of position magnets are disposed within the second cavity.

7. The door lock of claim 6, further comprising:
   at least two bumpers disposed at opposite ends of the second cavity to limit a range of motion of the base member within the second cavity and to provide a cushion between the base member and the inner surfaces of the second cavity.

8. The door lock of claim 1, further comprising:
   an override trigger for actuating the strike, wherein the lock housing further defines an override access cavity configured to house at least a portion of the override trigger; and
   an override access flap configured to conceal the override access trigger by covering the override access cavity when the override access flap is in a closed position, wherein the override access cavity and the override access trigger are at least partially exposed when the override access flap is in an open position.

9. The door lock of claim 1, further comprising brushings between the strike and the longitudinal cavity to reduce rattling of the strike within the longitudinal cavity.

10. The door lock of claim 1, wherein the at least one selector magnet is coupled to or at least partially embedded within a main body of the strike, and the plurality of position magnets are disposed within the longitudinal cavity.

11. An aircraft lavatory door system, comprising:
   an aircraft lavatory door; and
   a door lock coupled to the aircraft lavatory door, the door lock comprising:
      a strike;
      a lock housing that defines a longitudinal cavity configured to house at least a portion of the strike, the lock housing having an opening at an end of the longitudinal cavity for the strike to partially extend from the lock housing when the strike is moveably linearly actuated within the longitudinal cavity from an unlocked position to a locked position;
      at least one selector magnet coupled to or at least partially embedded within the strike; and
      a plurality of position magnets coupled to or at least partially embedded within the lock housing, the plurality of position magnets including at least a first magnet corresponding to the unlocked position of the strike, a second magnet corresponding to the locked position of the strike, and a third magnet disposed in between the first magnet and the second magnet, wherein the first and second magnets are configured to attract the at least one selector magnet, and the third magnet is configured to repel the at least one selector magnet.

12. The aircraft lavatory door system of claim 11, wherein the strike and the lock housing are configured to maintain a gap between the at least one selector magnet and the plurality of position magnets to prevent contact between the at least one selector magnet and the plurality of position magnets.

13. The aircraft lavatory door system of claim 11, wherein the first magnet and the second magnet are tuned so that an actuation force required to transition the strike from the unlocked position to the locked position is less than an actuation force required to transition the strike from the locked position to the unlocked position.

14. The aircraft lavatory door system of claim 11, wherein the strike includes a base member having the at least one selector magnet coupled to or at least partially embedded within the base member, the lock housing further defines a second cavity configured to house at least a portion of the base member, and the plurality of position magnets are disposed within the second cavity.

15. The aircraft lavatory door system of claim 11, wherein the door lock further comprises:
an override trigger for actuating the strike, wherein the lock housing further defines an override access cavity configured to house at least a portion of the override trigger; and
an override access flap configured to conceal the override access trigger by covering the override access cavity when the override access flap is in a closed position, wherein the override access cavity and the override access trigger are at least partially exposed when the override access flap is in an open position.

16. The aircraft lavatory door system of claim 11, wherein the at least one selector magnet is coupled to or at least partially embedded within a main body of the strike, and the plurality of position magnets are disposed within the longitudinal cavity.

17. A system for transitioning a selector element between discrete positions, the system comprising:
a selector element housing;
a selector element configured to be linearly moveably or rotationally moveably actuated to a selected position relative to the selector housing from a plurality of predefined discrete positions relative to the selector housing;
at least one selector magnet coupled to or at least partially embedded within the selector element; and
a plurality of position magnets coupled to or at least partially embedded within the selector element housing, the plurality of position magnets including at least a first magnet corresponding to a first position of the plurality of discrete positions of the selector element, a second magnet corresponding to a second position of the plurality of discrete positions of the selector element, and a third magnet disposed in between the first magnet and the second magnet, wherein the first and second magnets are configured to attract the at least one selector magnet, and the third magnet is configured to repel the at least one selector magnet.

18. The system of claim 17, wherein the plurality of position magnets further include at least a fourth magnet corresponding to a third position of the plurality of discrete positions, a fifth magnet corresponding to a fourth position of the plurality of discrete positions, and a sixth magnet disposed in between the fourth magnet and the fifth magnet, wherein the fourth and fifth magnets are configured to attract the at least one selector magnet, and the sixth magnet is configured to repel the at least one selector magnet.

19. The system of claim 17, wherein the selector is configured to be linearly actuated within selector housing, and the plurality of position magnets are arranged along a line parallel to an actuation axis of the selector.

20. The system of claim 17, wherein the selector is configured to be rotationally actuated within selector housing, and the plurality of position magnets are arranged along a curve that at least partially surrounds a rotational axis of the selector.

\* \* \* \* \*